United States Patent
Gupta et al.

(10) Patent No.: US 8,244,577 B2
(45) Date of Patent: Aug. 14, 2012

(54) USING WEB-MINING TO ENRICH DIRECTORY SERVICE DATABASES AND SOLICITING SERVICE SUBSCRIPTIONS

(75) Inventors: Narendra Gupta, Dayton, NJ (US);
Mazin Gilbert, Warren, NJ (US);
Benjamin J. Stern, Morris Township, Morris County, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 909 days.

(21) Appl. No.: 12/075,581

(22) Filed: Mar. 12, 2008

(65) Prior Publication Data
US 2009/0234812 A1  Sep. 17, 2009

(51) Int. Cl.
*G06Q 30/00* (2006.01)
(52) U.S. Cl. .................. 705/14; 705/14.49; 705/14.67; 705/14.4
(58) Field of Classification Search .............. 705/14.4, 705/14.49, 14.67
See application file for complete search history.

(56) References Cited

U.S. PATENT DOCUMENTS

| | | |
|---|---|---|
| 2003/0130993 A1 | 7/2003 | Mendelevitch et al. |
| 2004/0161097 A1 | 8/2004 | Henry |
| 2005/0033777 A1 | 2/2005 | Moraes et al. |
| 2006/0059129 A1* | 3/2006 | Azuma et al. ................. 707/3 |
| 2006/0245641 A1* | 11/2006 | Viola et al. ................. 382/155 |
| 2006/0253324 A1 | 11/2006 | Miller |
| 2007/0083509 A1 | 4/2007 | Wu et al. |
| 2007/0286169 A1 | 12/2007 | Roman |
| 2008/0071752 A1* | 3/2008 | Azuma et al. ................. 707/3 |
| 2008/0228574 A1 | 9/2008 | Stewart et al. |
| 2008/0255977 A1* | 10/2008 | Altberg et al. ............. 705/35 |
| 2009/0080635 A1* | 3/2009 | Altberg et al. ........ 379/216.01 |
| 2010/0287282 A1* | 11/2010 | MacLaughlin ........... 709/226 |

* cited by examiner

*Primary Examiner* — Lindsay M. Maguire

(57) ABSTRACT

A system and method are provided for augmenting information on business directory databases and communicating with businesses is disclosed. Using the enriched business directory database and Web mining technology, customized email message are sent inviting businesses to enter their enriched business information into the directory or even subscribe to other paid services provided by the directory service.

20 Claims, 2 Drawing Sheets

USING WEB-MINING TO ENRICH DIRECTORY SERVICE DATABASES AND SOLICITING SERVICE SUBSCRIPTIONS

CROSS REFERENCE TO RELATED APPLICATIONS

This application is related to U.S. patent application Ser. No. 12/075,570, entitled "Finding the Website of a Business Using the Business Name," by Narendra Gupta et al., filed on the same date as the present application, and is related to U.S. patent application Ser. No. 12/075,582, entitled "Using a Local Business Director to Generate Messages to Consumers," by Benjamin J. Stern et al., filed on the same date as the present application, the disclosures of which are hereby incorporated by reference herein in their entirety.

FIELD OF THE INVENTION

The present invention relates generally to a web-mining, and particularly to a business service whereby web-mining is used for enriching a business directory database, and communicating with businesses inviting them to enter their enriched business information into the directory or even subscribe to other paid services provided by the directory service.

BACKGROUND OF THE INVENTION

Business directory database websites, such as the Yellow-Pages.com (YPC) website, have brought the basic concept of traditional bound business directories into the Internet/WWW age while improving ease of use and functionality. The YPC can trace its history to 1996, when an independent publisher and two telecommunications companies (SBC and BellSouth) each launched their own online directories. They continued to operate separately until November 2004, when SBC and BellSouth entered into a partnership to create the Internet Yellow Pages joint venture, acquiring the online directory publisher then known as WWW.Yellowpages.com, Inc. The three separate sites were combined into one site called YellowPages.com. YPC offers searchable directory listings, and includes information on products/services provided, specialty, brands, payment options, languages spoken, certification & affiliation, coupons & deals, and user reviews. Also, when a user registers with YPC, addresses of interest, recent searches and recently viewed listings can be saved for future reference. Additionally, search information, maps and driving directions can be saved, emailed or sent by text message to a device capable of receiving this type of message.

Customers who search business listings directly are typically looking for a particular type of good or service, and are ready to purchase. The traditional bound business directories are by their nature published periodically (typically annually) and therefore cannot be changed once issued. It is very frustrating for consumers to call or worse travel to a listed business location only to find out they are no longer there or have changed their hours, and then have to start their search all over again. This is not a limitation of the YPC, as it is a live business directory database which is updated continuously as business or other conditions change.

Web and Internet based business directory databases, such as The YellowPages.com (or similar), contain a large number of business names, addresses and phone numbers. Only a small fraction of listings contain other frequently requested information such as the URL or business Internet address, email contact address or hours of operation. Not having a means whereby desired information is readily available or retrievable can leave consumers frustrated and possibly drive them to support those businesses that provide this information in anticipation of the request.

Businesses that market through the YPC listing could benefit from providing users access to a validated and enriched BDB by:

(1) reduced traffic to their website, where the same information is repeatedly searched for and retrieved;
(2) reduced call traffic to a switchboard or a call center to field the information requests;
(3) improved perception of the business in the mind of the customer as the business has anticipated frequently requested information and furnished it prior to asking;
(4) increased revenue as more customers potentially do business with a firm which has anticipated frequently requested information and provided it from a trusted source.

Additionally, the provider of the Web and Internet-based business directory databases, such as The YellowPages.com (or similar) may be able to command a premium listing fee from the businesses listing in their database for all the above mentioned reasons.

In order to grow their business, providers of Web and Internet-based business directory databases could benefit by improving the quality and quantity of information contained within their database. While such information is in the possession of businesses listed in the directory, there currently exists no efficient and cost effective technique to contact those businesses, solicit the information and receive the information.

It would therefore be desirable to use a system and method whereby web-mining technology is used to enrich a business directory database by facilitating contact with listing businesses. There is further a need for a system wherein once contact is established, offers for enhanced listing in the business directory database and/or promote paid subscription services could be made automatically.

SUMMARY OF THE INVENTION

In accordance with a first aspect of the invention, there is disclosed a method for enriching a directory service database by soliciting additional business information from businesses listed in the database. The method generally comprises the steps of: determining a URL of a listed business; classifying the listed business in a category by processing data located at the URL in a pre-trained classifier model; determining an email address of the listed business by mining the data located at the URL; and soliciting the listed business by delivering a message to the email address, the message being tailored to the category of the listed business.

The step of determining a URL of a listed business may comprise the steps of: conducting a network search using the business name as a search term; receiving results of the search including a plurality of URLs; and selecting the URL from the plurality of URLs, wherein the step of selecting the URL from a plurality of URLs may further comprise the steps of: determining confidence measures for the URLs, each confidence measure indicating a probability that the URL is sponsored by the business; and selecting the URL based on the confidence measures.

The step of determining a URL of a listed business may comprise the step of obtaining the URL from an on line domain name management company or may comprise crawling the Web to determine whether a Web page at the URL belongs to the business.

The step of classifying the listed business in a category by processing data located at the URL in a pre-trained classifier model may be a statistical/rules based classifier selected from the group consisting of a naive Bayes classifier, an AdaBoost algorithm and a support vector machine.

The step of determining an email address of the listed business by mining the data located at the URL may further comprise the steps of: searching the data located at the URL for a link containing a term selected from the list consisting of "contact" and "location"; and extracting the email address from text associated from a link found in the searching step.

The method may further comprise the step of: validating the determined email address by checking whether a domain name in the email is a domain name in the URL or validating the determined email address by checking whether at least a portion of the business name is contained in a user part of an email address hosted by an email hosting company.

The step of soliciting the listed business by delivering a message to the email address may further comprise inviting the business to subscribe to additional paid services offered by the business directory service.

In accordance with a second aspect of the invention, there is disclosed a computer-usable medium having computer readable instructions stored thereon for execution by a processor to perform methods as described above.

These aspects of the invention and further advantages thereof will become apparent to those skilled in the art as the present invention is described with particular reference to the accompanying drawings.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

An important consideration for consumers in deciding to use a specific directory service (such as the YellowPages.com) is the quality and quantity of information provided. The present invention comprises a system and method to enrich a directory service database by automatically soliciting service subscriptions. The subscriptions are solicited by first searching the Web to find the business URLs (websites), and then mining those URLs to determine a business category and email address for each business. Customized emails are then sent out using the email addresses and business categories. The email will invite businesses to enter their business information in the directory or even subscribe to other paid services provided by the directory service.

Figure 1:
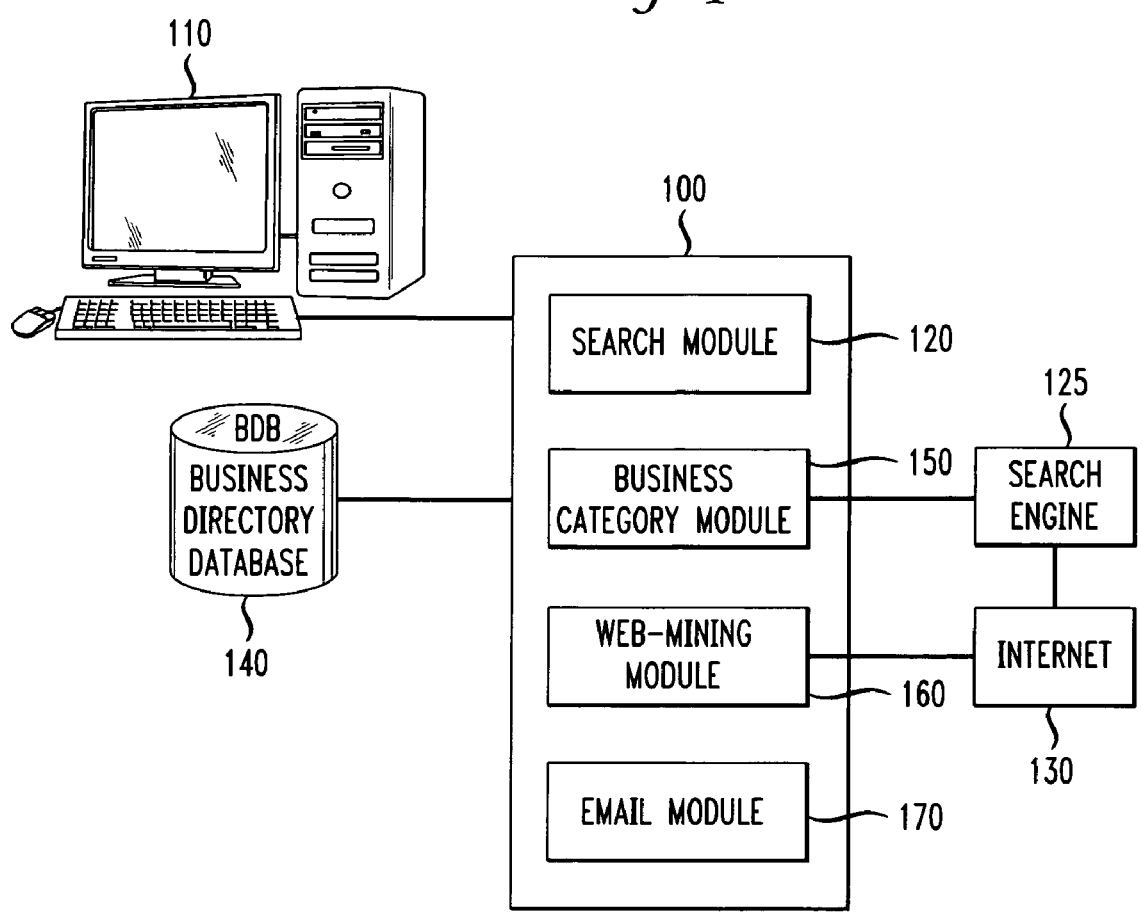
FIG. 1 is an illustrative system of an embodiment of the present invention for enriching a database and soliciting business services.

FIG. 1 illustrates a system 100 of the present invention for enriching a business directory database and soliciting business directory services. The system may be launched as an individual process for a particular business listing in the database, or may be running in the background as a daemon. For illustration purposes, a user interface 110 is used to launch the system 100 of FIG. 1.

For future references herein, the term Internet will generally refer to (but in no way be limited to): the World Wide Web (WWW), public, private, university, research laboratory search engines or databases, fee or subscription databases or other accessible sources of information.

The system 100 starts off with the search module 120 using the company name as a query in a search on the Internet 130 using a commercial search engine 125 or a plurality of search engines, such as Google® or Yahoo!®. The search engine 125 returns a plurality of possible URLs or website addresses to be used to discover the business website or URL by methods described herein or others as known by those skilled in the art.

In one embodiment of the invention, the URL of the business is obtained by using the company name as a query in a search on the Internet using a commercial search engine returning possible URLs, assigning a confidence measure to each returned URL using string matching algorithms based on Finite State Machines or other methods, and visiting the URL with the highest confidence measure to search for corroborating information already contained within a business directory database with information found on the URL. The foregoing exemplary system and method are described in detail in U.S. patent application Ser. No. 12/075,570, entitled "Finding the website of a business using the business name", assigned to the same assignee as the present application and filed concurrently with the present application.

URLs could also be obtained from domain registrars. A domain registrar is a company accredited by the Internet Corporation for Assignment Names & Numbers (ICANN) and has authority over generic Top Level Domains (gTLDs) examples such as .com, .net, .org and .mobi. Domain registrars such as GoDaddy.com (USA), Gabia.com (S. Korea) and Gandi.net (France) (among dozens of others) register directly while Google.com registers indirectly, through subcontractors. Domain registrars may be used in the present invention as resources providing "look-up" services to determine a domain name or URL from a business name.

Alternatively, a Web crawler may be used to determine if a URL belonging to a business. A Web crawler is a program or software agent which browses the Web in a methodical, automated manner. Crawler can be used for helpful purposes (i.e. keeping search engine cache current or checking links or validating HTML code) or unhelpful purposes (i.e. visiting websites to harvest email address for spain or overloading servers with indexing traffic leaving little bandwidth for actual search traffic). A crawler could be programmed to specifically search out and validate websites of businesses. Business URLs are returned to the business directory database BDB 140 to enrich the BDB.

A business category module 150 provides the functionality to determine the business category of the business. Examples are (but are in no way limited to) restaurants, sporting goods and dentists. This is accomplished within the module by using a pre-trained classifier model that receives as input text or other information from a business' Web site and outputs a category or categories that the business falls into. The pre-trained classifier model places each business into one or more categories based on information found on the business' Web site. The classifier utilizes a training set of previously labeled items. The classifier may, for example, be a statistical classifier, a rules-based classifier or a combination of the two. Examples of such classifiers include a naïve Bayes classifier, an AdaBoost algorithm and a support vector machine. Other techniques may be used, provided they result in the same functionality. The business category is returned to the business directory database BDB 140 to enrich the BDB.

The web-mining module 160 performs two functions: It mines the URL/Web page identified in the search module 120 for business email addresses, and then validates the addresses. The website may be searched for a link with the words "Contact" or "Location," or the phrase "Contact Us." Many business Web sites use these key words to help users navigate their site and find frequently requested information such as address, phone number and contact methods. When the web-mining module 160 discovers an email address it is extracted for its text using regular expressions (for example), or other methods as known by those skilled in the art. Additionally, email addresses may be extracted from the Web pages reached by the URL using well-know recognition techniques. Once an email address has been extracted, it may be validated by using following rules (for example):

(1) Domain name in the business email is highly likely to be the same as the domain name in the URL;
(2) If the business uses an email address provided by an email hosting company, like Gmail® or Yahoo!®, etc. it is highly likely that the business uses the business name or some part of it in the user part of the email address.

Only validated email addresses are returned to the business directory database BDB 140 to enrich the BDB.

The email module 170 uses the business category and the email addresses to send customized email messages. Customization could be based mainly on the business category as establish by the business category module 150. The invitation could contain (but in no way be limited to) inviting a business to join or upgrade its listing contained in the database and/or soliciting subscription services the BDB service provider offers. Such subscription services might include, for example, priority positioning of the business's listing, and the placing of multimedia ads.

Figure 2:
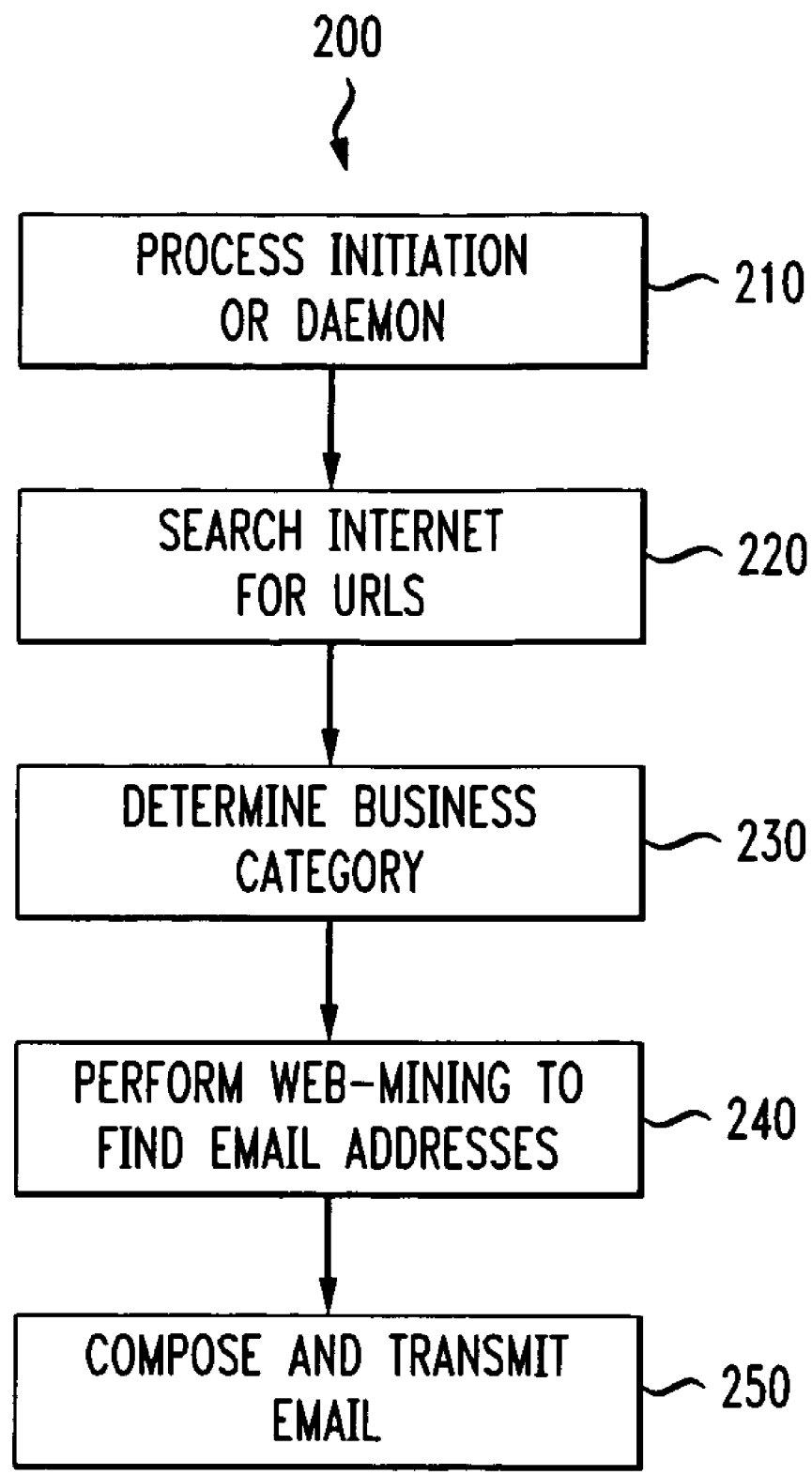
FIG. 2 is a method illustrating an embodiment of the present invention for enriching a database and soliciting business services.

FIG. 2 illustrates a method of an embodiment 200 of the present invention for enriching a business directory database (BDB) and soliciting business services. A business directory database initially contains very basic business information such as business name, address and phone number.

The process is typically launched (step 210) as either a distinct process initiation step (specific request to run) or a daemon (running in the background).

A search is executed (step 220) executes on the Internet and returns a business URL/website, and enriches the BDB.

Determination of the business category (step 230) is made by statistical classification algorithms or other method(s), which is (are) used to enrich the BDB.

Web-mining is performed (step 240) searching for email address on the URL/website identified in step 220 and validating the email address. Only validated email addresses will be used to enrich the BDB.

Email messages are composed and transmitted (step 250) using the validated email address from step 240. Customized email messages are sent inviting the business to enter their enriched business information into a directory or even subscribe to other paid services provided by the directory service.

This invention presents a number of benefits to the users, the businesses listed in a directory and to the BDB service provider. Businesses may already have low cost or free listing of their information on the directory service. By enhancing the quality and quantity of information available in the directory, search results could be improved, providing a clear differentiation to the directory service in the mind of users. An improved perception in the mind of the user could result in increased user traffic on the directory page providing a business justification for those listed in the BDB to pay a premium for advertising on the BDB or even subscribing to other paid services provided by the BDB service.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method for enriching a directory service database by soliciting additional business information from businesses listed in the database, the method comprising:
   by a processor in a business directory service provider server, serving a business listing on a business directory Website, the business listing containing basic information about a listed business;
   by a processor, determining a URL of the listed business by conducting an Internet search using a name of the listed business as a search term;
   by a processor, classifying the listed business in a category by processing data located at the URL in a pre-trained classifier model;
   by a processor, mining the data located at the URL for the email address of the listed business; and
   by a processor, transmitting from the business directory service provider server to the email address of the listed business mined from the data located at the URL, an email message soliciting, from the listed business, additional business information including hours of operation to enrich the basic information about the listed business, the message being tailored to the category of the listed business.

2. The method of claim 1, wherein the determining a URL of a listed business comprises:
   receiving results of the Internet search including a plurality of URLs; and
   selecting the URL from the plurality of URLs.

3. The method of claim 2, wherein the selecting the URL from a plurality of URLs further comprises:
   determining confidence measures for the URLs, each confidence measure indicating a probability that the URL is sponsored by the business; and
   selecting the URL based on the confidence measures.

4. The method of claim 1, wherein the determining a URL of a listed business comprises:
   obtaining the URL from an on line domain name management company.

5. The method of claim 1, wherein the determining a URL of a listed business comprises
   crawling the Web to determine whether a Web page at the URL belongs to the business.

6. The method of claim 1, wherein the pre-trained classifier model is a statistical/rules based classifier selected from the group consisting of a naive Bayes classifier, an AdaBoost algorithm and a support vector machine.

7. The method of claim 1, wherein the mining for an email address of the listed business further comprises:
- searching the data located at the URL for a link containing a term selected from the list consisting of "contact" and "location"; and
- extracting the email address from text associated from a link found in the searching.

8. The method of claim 1, further comprising:
- validating the mined email address by checking whether a domain name in the email is a domain name in the URL.

9. The method of claim 1, further comprising:
- validating the mined email address by checking whether at least a portion of the business name is contained in a user part of an email address hosted by an email hosting company.

10. The method of claim 1, wherein soliciting the listed business by delivering a message to the email address further comprises inviting the business to subscribe to additional paid services offered by the business directory service.

11. A tangible computer-readable medium having computer readable instructions stored thereon for execution by a processor to perform a method for enriching a directory service database by soliciting additional business information from businesses listed in the database, the method comprising:
- in a business directory service provider server, serving a business listing on a business directory Website, the business listing containing basic information about a listed business;
- in the business directory service provider server, determining a URL of a listed business by conducting an Internet search using a name of the listed business as a search term;
- classifying the listed business in a category by processing data located at the URL in a pre-trained classifier model;
- mining the data located at the URL for the email address of the listed business; and
- transmitting from the business directory service provider server to the email address of the listed business an email message mined from the data located at the URL, soliciting, from the listed business, additional business information including hours of operation to enrich the basic information about the listed business, the message being tailored to the category of the listed business.

12. The tangible computer-readable medium of claim 11, wherein the determining a URL of a listed business comprises:
- receiving results of the Internet search including a plurality of URLs; and
- selecting the URL from the plurality of URLs.

13. The tangible computer-readable medium of claim 12, wherein the selecting the URL from a plurality of URLs further comprises:
- determining confidence measures for the URLs, each confidence measure indicating a probability that the URL is sponsored by the business; and
- selecting the URL based on the confidence measures.

14. The tangible computer-readable medium of claim 11, wherein the determining a URL of a listed business comprises:
- obtaining the URL from an on line domain name management company.

15. The tangible computer-readable medium of claim 11, wherein the determining a URL of a listed business comprises
- crawling the Web to determine whether a Web page at the URL belongs to the business.

16. The tangible computer-readable medium of claim 11, wherein the pre-trained classifier model is a statistical/rules based classifier selected from the group consisting of a naive Bayes classifier, an AdaBoost algorithm and a support vector machine.

17. The tangible computer-readable medium of claim 11, wherein the mining for an email address of the listed business further comprises:
- searching the data located at the URL for a link containing a term selected from the list consisting of "contact" and "location"; and
- extracting the email address from text associated from a link found in the searching.

18. The tangible computer-readable medium of claim 11, wherein the method further comprises:
- validating the mined email address by checking whether a domain name in the email is a domain name in the URL.

19. The tangible computer-readable medium of claim 11, wherein the method further comprises:
- validating the mined email address by checking whether at least a portion of the business name is contained in a user part of an email address hosted by an email hosting company.

20. The tangible computer-readable medium of claim 11, wherein the soliciting the listed business by delivering a message to the email address further comprises inviting the business to subscribe to additional paid services offered by the business directory service.

* * * * *